US010334443B2

(12) United States Patent
Seo et al.

(10) Patent No.: US 10,334,443 B2
(45) Date of Patent: *Jun. 25, 2019

(54) METHOD FOR CONFIGURING PROFILE OF SUBSCRIBER AUTHENTICATING MODULE EMBEDDED AND INSTALLED IN TERMINAL DEVICE, AND APPARATUS USING SAME

(71) Applicant: KT Corporation, Seongnam-si (KR)

(72) Inventors: Myoung Hee Seo, Seoul (KR); Kwan Lae Kim, Seoul (KR); Chul Hyun Park, Seoul (KR); Jin Hyoung Lee, Seoul (KR); Hyung Jin Lee, Seoul (KR); Youn Pil Jeung, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,123

(22) Filed: Jul. 10, 2017

(65) Prior Publication Data

US 2017/0318465 A1 Nov. 2, 2017

Related U.S. Application Data

(63) Continuation of application No. 14/443,788, filed as application No. PCT/KR2013/010022 on Nov. 6, 2013, now Pat. No. 9,706,407.

(30) Foreign Application Priority Data

Nov. 19, 2012 (KR) .................. 10-2012-0131051
May 23, 2013 (KR) .................. 10-2013-0058111

(51) Int. Cl.
*H04W 12/08* (2009.01)
*H04W 8/20* (2009.01)
(Continued)

(52) U.S. Cl.
CPC .......... *H04W 12/08* (2013.01); *H04L 63/102* (2013.01); *H04L 67/306* (2013.01); *H04W 8/183* (2013.01); *H04W 8/20* (2013.01)

(58) Field of Classification Search
CPC ......... H04M 3/00; H04W 4/00; H04W 12/08; H04W 8/183; H04W 8/20; G06F 9/44;
(Continued)

(56) References Cited

U.S. PATENT DOCUMENTS 7,657,871 B2* 2/2010 Velupillai ........... H04L 41/0681
717/121
8,359,016 B2* 1/2013 Lindeman ............... H04L 67/34
455/414.1
(Continued)

FOREIGN PATENT DOCUMENTS

EP          2 461 613 A1    6/2012
KR    10-2010-0019235 A    2/2010
(Continued)

OTHER PUBLICATIONS

International Search Report of PCT/KR2013/010022, dated Feb. 25, 2014. [PCT/ISA/210].

*Primary Examiner* — Thanhnga B Truong
(74) *Attorney, Agent, or Firm* — Sughrue Mion, PLLC

(57) ABSTRACT

A method for configuring a profile of a subscriber authenticating module embedded and installed in a terminal device, and an apparatus using same, are disclosed. The subscriber authenticating module embedded and installed in the terminal device according to an exemplary embodiment includes one or more network access application related data sets and one or more profiles having unique identifiers. The present invention enables an eco-system provider such as a network
(Continued)

service provider, a eUICC manufacturer, or a terminal manufacturer to develop an efficient and rapid eUICC and provide a eUICC service.

19 Claims, 10 Drawing Sheets

(51) Int. Cl.
    *H04L 29/08*     (2006.01)
    *H04W 8/18*     (2009.01)
    *H04L 29/06*     (2006.01)

(58) Field of Classification Search
    CPC ........... G06F 3/00; H04L 9/32; H04L 63/102; H04L 67/306

USPC ....... 713/169, 154, 168; 709/223; 726/1, 25, 726/29, 9; 455/419, 414.1; 717/121; 725/46

See application file for complete search history.

(56) References Cited

U.S. PATENT DOCUMENTS

| | | | |
|---|---|---|---|
| 8,473,743 B2* | 6/2013 | Freedman | H04L 63/02 |
| | | | 713/169 |
| 9,137,656 B2* | 9/2015 | O'Leary | H04W 8/22 |
| 2011/0130117 A1 | 6/2011 | Fan et al. | |

FOREIGN PATENT DOCUMENTS

| | | |
|---|---|---|
| KR | 10-2011-0050426 A | 5/2011 |
| KR | 10-2012-0029466 A | 3/2012 |

\* cited by examiner

FIG. 3

A CASE IN WHICH ATTRIBUTE DATA AND POLICY RULE DATA OF PROFILE HAVE SEPARATE EF FORMS

| Identifier: '2FXX' | | Structure: transparent | | Mandatory |
|---|---|---|---|---|
| File size: 1 bytes | | | Update activity: low | |
| Access Conditions:<br>    READ          ALW<br>    UPDATE      ADM<br>    DEACTIVATE  ADM<br>    ACTIVATE    ADM | | | | |
| Bytes | Description | | M/O | Length |
| 1 | Profile Type | | M | 1 bytes |

PROFILE TYPE DATA

| b8 | b7 | b6 | b5 | b4 | b3 | b2 | b1 | Profile Type |
|---|---|---|---|---|---|---|---|---|
| - | - | - | - | - | - | - | 1 | Provisioning Profile |
| - | - | - | - | - | - | 1 | - | Operational Profile |
| Any other values | | | | | | | | RFU |

PROFILE PRIVILEGE DATA

| b8 | b7 | b6 | b5 | b4 | b3 | b2 | b1 | Profile Type |
|---|---|---|---|---|---|---|---|---|
| - | - | - | - | - | - | - | 1 | Default Selected |
| - | - | - | - | - | - | 1 | - | Global Service |
| Any other values | | | | | | | | RFU |

FIG. 4

A CASE IN WHICH ATTRIBUTE DATA AND POLICY RULE DATA OF PROFILE HAVE ONE EF FORM

| Identifier: '2FXX' | | Structure: transparent | | Mandatory |
|---|---|---|---|---|
| File size: N bytes | | Update activity: low | | |
| Access Conditions:<br>    READ        ALW<br>    UPDATE     ADM<br>    DEACTIVATE ADM<br>    ACTIVATE   ADM | | | | |
| Bytes | Description | | M/O | Length |
| 1~X | Profile Identifie | | M | X bytes |
| X+1 | Profile Type | | M | 1 bytes |
| X+2 | Profile Life Cycle State | | M | 1 bytes |
| X+3 ~ X+5 | Profile owner MNO code(PLMN) | | O | 3 bytes |
| X+6 | Profile Privilege | | O | 1 bytes |
| X+7 ~ X+Y+6 | Profile Size | | O | Y bytes |
| X+Y+7 ~ X+Y+8 | Profile Version | | O | 2 bytes |
| X+Y+9 | Supported Terminal Type | | O | 1 bytes |
| X+Y+10 | Delete Permission | | O | 1 bytes |
| X+Y+11 | Status Change Permission | | O | 1 bytes |
| X+Y+12 | Status Change Notification | | O | 1 bytes |
| X+Y+13 | Type Change Permission | | O | 1 bytes |
| X+Y+14 ~ X+Y+Z+13 | NAA | | O | Z(5~16) bytes |
| | : | | O | |
| | NAAn | | O | 5~16 bytes |

FIG. 5

A CASE IN WHICH ATTRIBUTE DATA AND POLICY RULE DATA OF PROFILE
HAVE A DATA OBJECT FORM IN THE PROFILE

| TAG | LENGTH | NAME | PRESENCE |
|---|---|---|---|
| '66' | | Profile attribute data Template | |
| '61' | | Profile Template | |
| '4F' | 5~16 | Profile Identifier | |
| '9F50' | 1 | Profile owner MNO code(PLMN) | |
| '9F70' | 1 | Profile Privilege | |
| '9F41' | 3 | Profile Size | Conditional |
| '9F52' | 1 | Profile Version | |
| '9F53' | 1~3 | Supported Terminal Type | |
| '9F54' | 2 | Profile Version | |
| '9F55' | 1 | Supported Terminal Type | |
| '9F51' | 1 | Number of installed NAAs | |
| '6E' | | Application Template | |
| '4F' | 5~16 | NAA AID | |
| '4F' | 5~16 | NAA AID | |
| '9D' | | Profile Policy Rule Template | |
| '9F60' | 1 | Delete Permission | |
| '9F61' | 1 | Status Change Permission | |
| '9F62' | 1 | Status Change Notification | |
| '9F63' | 1 | Type Change Permission | |

METHOD FOR CONFIGURING PROFILE OF SUBSCRIBER AUTHENTICATING MODULE EMBEDDED AND INSTALLED IN TERMINAL DEVICE, AND APPARATUS USING SAME

CROSS-REFERENCE OF RELATED PATENT APPLICATIONS

This is a continuation application of U.S. patent application Ser. No. 14/443,788, filed on May 19, 2015, which is a National Phase Application of International Patent Application No. PCT/KR2013/010022, filed on Nov. 6, 2013, which claims the benefit of Korean Patent Application No. 10-2012-0131051, filed on Nov. 19, 2012, and Korean Patent Application No. 10-2013-0058111, filed on May 23, 2013, the disclosures of which are incorporated herein in their entirety by reference.

BACKGROUND

1. Technical Field

Apparatuses and methods consistent with exemplary embodiments relate to a profile configuration in a subscriber authenticating module, and more particularly, to a profile configuring method of a subscriber authenticating module embedded and installed in a terminal device, and an apparatus using the same.

2. Description of Related Art

A universal integrated circuit card (UICC) is a smart card that may be inserted into a terminal and used as a module for authenticating network access. A UICC may include a Network Access Application (NAA) for accessing several networks of an operator, such as a Universal Subscriber Identity Module (USIM) for accessing a WCDMA/LTE network and a Subscriber Identity Module (SIM) for accessing a GSM network.

For a terminal requiring miniaturization and durability, such as a Machine to Machine (M2M) terminal, an embedded SIM (hereinafter referred to as eSIM or eUICC) that is integrally equipped when the terminal is produced has been proposed instead of the existing removable UICC.

The eUICC provides a network access authentication function like the existing removable UICC. However, network accesses of several operators should be able to be processed using one eUICC because of a difference in physical structure. Furthermore, there are many issues such as eUICC opening/distribution/subscriber information security and thus solutions for the issues need to be provided. In order to solve this, international standardization organizations such as Groupe Speciale Mobile Association (GSMA) and European Telecommunications Standards Institute (ETSI) have developed standardization activities on a necessary element including a top structure together with related companies such as a network operator, a manufacturer, and a SIM vendor.

In ETSI, a working group (WG) for establishing an eUICC standard is active, and currently requirements are being established to define a module that is called a 'profile' to personalize an application for a network access authentication function of several operators, such that the profile may be remotely installed to the eUICC and managed. In addition, a management policy and an application solution of the profile are being discussed, but detailed solutions have not yet been defined.

Since details associated with profile management of the eUICC are not defined, a eUICC card manufacturer, a terminal manufacturer, and an eco-system operator have many difficulties in developing and commercializing the eUICC.

SUMMARY

Exemplary embodiments are directed to a profile configuration method of a subscriber authenticating module embedded and installed in a terminal device.

In ETSI, the types and the uses of the profiles are defined, and essential basic data is defined. However, contents of management data, a supported instruction interface, and a function for each type of the profile and their application methods have not yet been discussed.

Exemplary embodiments are also directed to an apparatus using the profile configuration method.

One aspect of an exemplary embodiment provides a subscriber authenticating device embedded and installed in a terminal device, the subscriber authenticating device comprising at least one processor comprising one or more profiles including one or more sets of data associated with a network access application, the one or more profiles having unique identifiers.

The data associated with the network access application includes one or more network access applications and associated access credentials.

The network access application may include at least one from among parameter data and a file structure for network access.

The profile according to the present invention manages one or more from among profile attribute data and a profile policy rule.

The profile attribute data may comprise one or more from among a profile identifier, a profile type, profile state information, mobile network operator information, a list of network access applications belonging to the profile, a privilege, a profile data size, a profile version, and a terminal type supported by the profile.

The profile-associated policy rule may comprise one or more from among whether to allow profile deletion, whether to notify change of profile state, whether to allow change of profile state, whether to allow change of profile type, and whether to allow profile initialization.

The profile may further include an interface for interfacing with an object inside or outside the subscriber authenticating device.

The profile may provide secure messaging to communicate with an object provided inside or outside the subscriber authenticating device.

The interface receives a message for one or more of profile selection, profile-attribute-data-associated management, security authentication, profile management key management, and profile-registration-associated management and returns a corresponding value.

Another aspect of the exemplary embodiments provide a terminal device including a subscriber authenticator which is embedded and installed in the terminal device, the subscriber authenticator including one or more profiles which include one or more sets of data associated with a network access application, the one or more profiles having unique identifiers, and a subscription manager interoperable with the subscriber authenticator.

The subscription manager transmits one from among a request to change and an inquiry about profile-associated information to the subscriber authenticator.

The subscriber authenticator returns a response value to the subscription manager in response to one from among the request change and the inquiry.

The inquiry profile-associated information according to an exemplary embodiment comprises one or more from among profile attribute data and a profile policy rule.

Still another aspect of an exemplary embodiment provides a profile configuration method including configuring one or more profiles which include one or more sets of data associated with a network access application, the one or more profiles having unique identifiers.

The method further includes receiving a request to change or inquire about profile-associated information from an object positioned inside or outside a subscriber authenticating device.

The method may further include returning a response value to the object positioned inside or outside the subscriber authenticating device in response to the change request or inquiry.

The method according to an exemplary embodiment may manage one or more of profile attribute data and a profile policy rule.

The profile attribute data may comprise one or more among a profile identifier, a profile type, profile state information, mobile network operator information, a list of network access applications belonging to the profile, a privilege, a profile data size, a profile version, and a terminal type supported by the profile.

The profile policy rule may comprise one or more from among whether to allow profile deletion, whether to notify profile state change, whether to allow profile state change, whether to allow profile type change, and whether to initialize the profile.

According to an exemplary embodiment, the profile attribute data and profile policy rule may be defined as respective elementary files under an application dedicated file (ADF).

According to another exemplary embodiment, the profile attribute data and profile policy rule may be defined as one elementary file under a master file.

According to still another exemplary embodiment, the profile attribute data and profile policy rule may be defined as data object template in the profile.

According to yet another exemplary embodiment, a non-transitory computer-readable recording medium may store a program comprising instructions to cause a computer to perform the above-described method.

An exemplary embodiment can allow an eco-system operator such as a network service operator, an eUICC manufacturer, and a terminal manufacturer to develop an eUICC and provide an eUICC service efficiently and rapidly, by defining contents of the profile management data, the external interoperable interface, and security characteristics needed for the eUICC-internal management module or the external interoperable device to manage profiles installed on the eUICC.

BRIEF DESCRIPTION OF DRAWINGS

FIG. 3 illustrates an exemplary embodiment of a profile configuration method according to the present invention.

FIG. 4 illustrates another exemplary embodiment of a profile configuration method.

FIG. 5 illustrates still another exemplary embodiment of a profile configuration method.

DETAILED DESCRIPTION OF EXEMPLARY EMBODIMENTS

Figure 1:
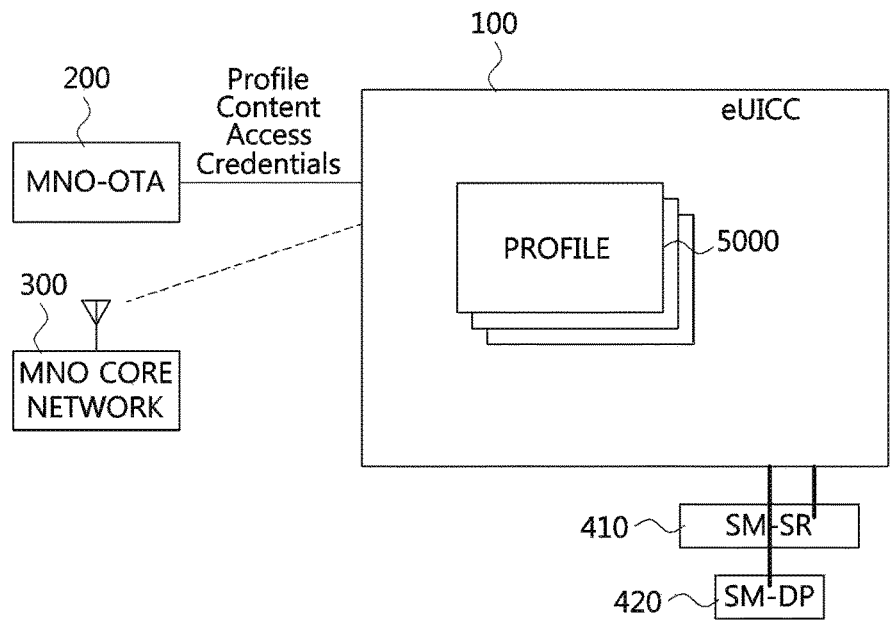
FIG. 1 is a view illustrating a connection relationship between a eUICC and an external peripheral device according to an exemplary embodiment.

Since the present invention may be variously modified and have several exemplary embodiments, specific exemplary embodiments will be shown in the accompanying drawings and be described in detail in a detailed description.

However, it should be understood that the present invention is not limited to these exemplary embodiments, and may include any and all modification, variations, equivalents, substitutions and the like within the spirit and scope thereof.

The terms used in the present specification are set forth to explain the exemplary embodiments, and the scope of the present invention is not limited thereto. The singular number includes the plural number as long as they are not apparently different from each other in meaning. In the present specification, it will be understood that the terms "have," "comprise," "include," and the like are used to specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Terms, such as terms that are generally used and have been in dictionaries, should be construed as having meanings matched with contextual meanings in the art. In this description, unless defined clearly, terms are not interpreted in an idealized or overly formal sense.

Also, the terms described below are defined based on the functions in the exemplary embodiments, and thus may vary depending on intentions of a client, an operator, or a user, or precedents. Accordingly, the definition would be made on the basis of the entire specification.

The term 'embedded UICC (eUICC)' or 'embedded SIM' means an embedded SIM integrally installed when the terminal is manufactured, unlike an existing removable UICC.

The term 'terminal' used herein may be referred to as a mobile station (MS), a user equipment (UE), a user terminal (UT), a wireless terminal, an access terminal (AT), a subscriber unit (SU), a subscriber station (SS), a wireless device, a wireless communication device, a wireless transmit/receive unit (WTRU), a mobile node, a mobile device, or the like. Various exemplary embodiments of the terminal may include a cellular phone, a smart phone with a wireless communication function, a personal digital assistant (PDA) with a wireless communication function, a wireless modem, a portable computer with a wireless communication function, an imaging apparatus such as a digital camera with a wireless communication function, a gaming apparatus with a wireless communication function, a home appliance for storing and playing music files with a wireless communication function, an Internet home appliance capable of wireless Internet connection and browsing as well as portable units or terminals incorporating combinations of the functions.

In addition, the terminal may include, but is not limited to, a machine-to-machine (M2M) terminal and a machine type communication (MTC) terminal/device.

In addition, each block or operation described herein may indicate a portion of a module, segment, or code including one or more executable instructions to execute a specific logical function(s). In addition, in some exemplary embodiments, it should be recognized that the functions described in the blocks or operations can be performed out of order. For example, two successively illustrated blocks or operations may be actually performed at the same time or may be performed in reverse order depending on the corresponding function.

Hereinafter, exemplary embodiments will be described in detail with reference to the accompanying drawings. In describing the exemplary embodiments, in order to facilitate the entire understanding of the exemplary embodiments, like numbers refer to like elements throughout the description of the figures and the repetitive description thereof will be omitted.

A profile of a eUICC may include unique data, key information, or the like of a mobile network operator, and the mobile network operator or a third operator authorized by the mobile network operator may generate and manage the profile. However, when the profile on the eUICC is managed and operated, a standardized interoperable interface, which is provided by a profile for an external interoperable device 400 (for example, a subscription manager (SM)—FIG. 6) or a eUICC-internal management module, is needed. Furthermore, attribute data and a policy rule, which are managed by the profile and may be provided to the outside, are necessarily defined.

If the standardized interface specification and data are not defined, an external device (for example, a subscriber management module (SM)) or an eUICC-internal management module, which manages several profiles, may require optimal development for profile characteristics of respective mobile network operators, thereby consuming many resources for development and commercialization.

In order to solve above-described problems, exemplary embodiments define contents that should be basically provided according to profile types such as a security function, an interoperable interface, and attribute data and policy rules that are managed by the profile, and the exemplary embodiments also propose a method of applying the definitions and various exemplary embodiments in which a profile is actually applied on the eUICC through the method.

The profile according to an exemplary embodiment is a module including one or more network access applications (including parameter data, a file structure, and so on for accessing a network) and network access credentials. The profile may be provided on the eUICC using a unique value (ID), and the types of the profile include a provisioning profile, an operational profile, and so on.

The provisioning profile is a profile containing one or more network access applications and associated network access credentials which, when installed on a eUICC, enables access to a communication network, to provide transport capability for eUICC management and profile management between the eUICC and a subscription manager-secure routing (SM-SR).

The operational profile is a profile containing one or more network access applications and associated network access credentials.

As such, there may be several profiles (the operational profile or provisioning profile) on the eUICC, unlike the existing removable USIM.

A profile configuration method according to the exemplary embodiments largely includes a method of managing basic attribute data and a policy rule of the profile, a method of providing a eUICC-internal/external interoperable interface for managing the profile, and a method of securing the profile.

In a first exemplary embodiment of the profile configuration method, the profile is configured to include attribute data and a policy rule of the profile.

In this case, the attribute data of the profile may include one or more of a profile identifier, a profile type, state information, mobile network operator (MNO) information, a list of network access applications (NAAs) belonging to the profile, a privilege, a profile data size, a profile version, and information related to a profile support terminal type.

In addition, the policy rule of the profile includes a policy rule for one or more of whether to allow profile deletion, whether to notify about a change of profile state, whether to allow a change of profile state, and whether to allow a change of profile type.

In a second exemplary embodiment of the profile configuration method, the profile is configured to include a eUICC-internal/external interoperable interface for profile management.

Here, the eUICC-internal/external interoperable interface may include an interface for selecting a profile, an interface for inquiring about, adding, and modifying attribute data and a policy rule of the profile, an interface for changing a profile state, an interface for performing security authentication between the profile and an object outside the eUICC (or an object inside the eUICC), an interface for setting and changing a profile management key, and an internal interface for registering with or deregistering from the eUICC when the profile is installed or deleted.

In a third exemplary embodiment of the profile configuration method, a profile security method is included.

Here, the profile security method performs profile security using one or more methods of managing (for example, issuing, modifying, and deleting) the attribute data and policy rule data of the profile through secure messaging with the eUICC-internal/external interoperable device 400 or over-the-air (OTA).

In summary, an exemplary embodiment defines the attribute data and the policy rule data that are basically managed and provided by the profiles in order to provide the same network access function as the existing removable USIM card to the eUICC.

In addition, an exemplary embodiment defines an interface for internally or externally interoperating with the eUICC and proposes embodiments of using the interface.

In addition, an exemplary embodiment defines a security function that should be provided by the profile.

Furthermore, the present invention proposes basic data including a provisioning profile and a data structure that manages the basic data.

FIG. 1 is a view illustrating a connection relationship between a eUICC and an external peripheral device according to an exemplary embodiment.

A eUICC 100 according to an exemplary embodiment includes one or more profiles as shown in FIG. 1. As shown in FIG. 1, there are several profiles in the eUICC. A loaded profile indicates a case in which only a profile block is loaded. An installed profile is in the form of an active (enabled) profile 5100 or a non-active (disabled) profile 5200 depending on the state.

The eUICC 100 may also be connected with a mobile network operator-over the air (MNO-OTA) 200, an MNO core network 300, one or more subscription manager-secure routings (SM-SRs) 410, and one or more subscription manager-data preparations (SM-DPs) 420.

The MNO-OTA 200 and the MNO core network 300 are operated by an entity that provides communication services to its customers through mobile networks, that is, by a mobile network operator. As shown in FIG. 1, the MNO-OTA 200 provides profile content access credentials to the eUICC 100.

The SM-SR 410 has a role that securely performs functions which directly manage the operational and provisional profiles on the eUICC. Furthermore, the SM-DP 420 has a role that prepares the operational and provisional profiles to be securely provisioned on the eUICC, e.g., encryption of profile.

A subscription management module (SM) is a combination of the SM-SR 410 and the SM-DP 420 and may be understood as a system that provides functions which securely manages profiles on the eUICC and securely provisions the profile on the eUICC.

Figure 2:
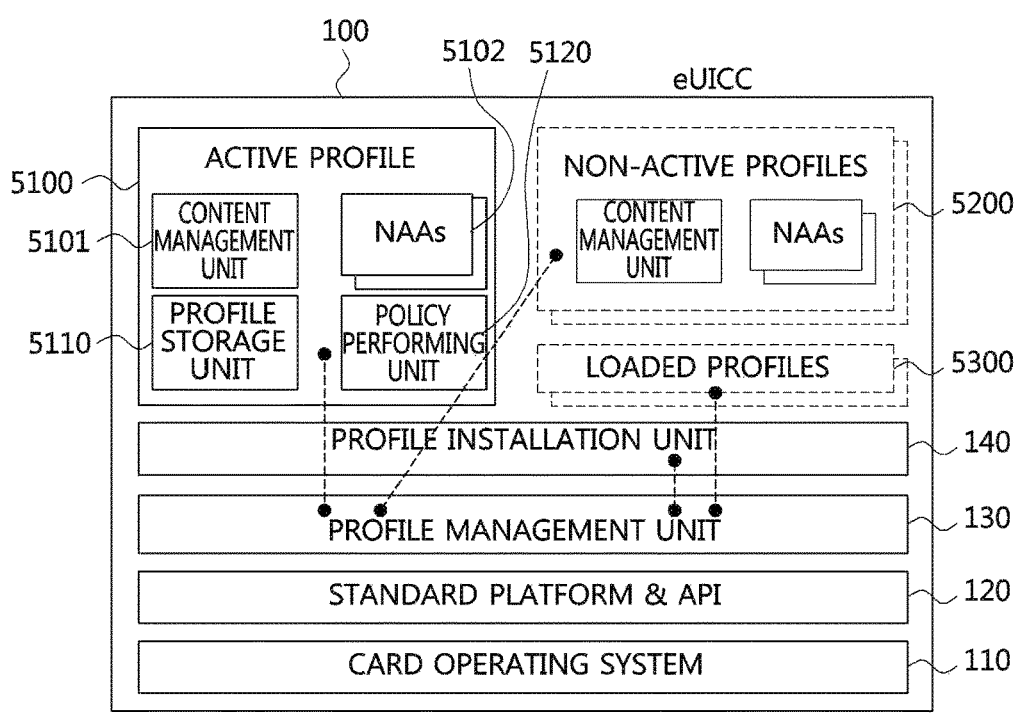
FIG. 2 is a block diagram of a eUICC module according to an exemplary embodiment.

FIG. 2 is a block diagram of a eUICC module according to an exemplary embodiment.

Elements to be described below through FIG. 2 may be elements that are defined not by physical properties but by functional properties. Thus, each element may be defined by its functions. Each element may be implemented as hardware and/or a program code and a processing unit or processor for performing its function. Functions of two or more elements may be included in one element. Yet further, if any element is implemented as hardware, the skilled artisan would recognize the structure associated with the respective element.

It should be noted that names of elements in the exemplary embodiment are not given to physically classify the elements but are given to imply representative functions performed by the elements, and the technical spirit of the present invention is not limited by the names of the elements.

As shown in FIG. 2, the eUICC 100 according to an exemplary embodiment basically includes a card operating system 110 and a standard platform & API 120 such as Java Cards. The eUICC 100 may also include a profile management unit (manager) 130 and a profile installation unit (installer) 140 that manages and installs profiles, respectively, as modules for providing the profiles to high layers of the card operating system 110 and the standard platform & API 120.

The eUICC 100 according to an exemplary embodiment includes one or more profiles. The profile may be classified into several types depending on the state. The profile may be defined as a loaded profile 5300 when the profile is loaded in a memory in which a profile block is not changed (for example, an EEPROM, a flash memory).

In addition, the profile may be defined as an installed profile when the profile block is loaded and decoded by the profile installation unit 140, necessary memory allocation is accomplished, and then necessary data issuance is completed. The installed profile may be in the form of the enabled profile 5100 or the disabled profile 5200 depending on the state.

Here, the enabled profile 5100 denotes a profile in a state where a profile is installed and then network access applications (NAAs) belonging to the profile are selectable. The disabled profile 5200 denotes a profile in a state where a profile is installed but network access applications (NAAs) belonging to the profile are not selectable.

The installed profile (e.g., the enabled profile 5100 and the disabled profiles 5200 in FIG. 2) includes a content management unit 5101 that provides a function capable of remotely managing data of the profile, and a network access application (NAA) 5102.

The installed profile also includes a profile storage unit (registry) 5110 for managing profile attribute data and a policy rule and a policy performing unit (enforcement function) 5120 for performing the policy rule. Here, the policy rule defines the actions required to implement a eUICC management policy associated with eUICC remote management.

The profile installation unit 140 has credentials for installing a profile instance as a module for verifying, decrypting, and installing profile data.

The profile management unit 130 may include a profile block management, a profile information registry, and a profile-associated policy enforcement function therein.

The profile block management is a module that manages an encrypted data block when the profile is installed, and has keys for installing, deleting, activating, and deactivating a profile.

The profile information registry manages a profile list installed in interoperation with the profile installation unit, and manages an NAA list, a profile state, and profile type information of a corresponding profile.

The profile-associated policy enforcement function performs a role that manages and applies policy-associated policies.

Profile Management Data

The attribute data that is managed by the profile according to an exemplary embodiment, may include data as illustrated below:
Profile identifier, profile type
Profile state information
Mobile network operator (MNO, profile owner) information
List of network access applications (NAAs) belonging to profile.
Privilege of profile
Profile data size Profile version Terminal type supported by profile.

Among the above-listed attribute data, the profile identifier, profile type, and profile state information may be essentially included as profile attribute data, and one or more pieces of the remaining attribute data may be additionally included.

The policy rule data that is managed by the profile according to an exemplary embodiment, may include one or more pieces of the data as illustrated below:

Whether to allow profile deletion
Whether to allow change of profile state
Whether to notify change of profile state
Whether to allow change of profile type
Whether to allow profile initialization.

A scheme in which the attribute data and the policy rule data the profile manages are actually managed in the profile may include a first scheme in which each piece of the attribute data or the policy rule data is managed in the form of an elementary file (EF), a second scheme in which all pieces of the attribute data and the policy rule data are managed in the form of one elementary file (EF), and a third scheme in which the attribute data and the policy rule data are managed in the form of a data object template (a value field of the data object is composed of a set of several data objects) inside the profile.

In FIGS. 3 to 5, the three schemes in which the attribute data and the policy rule data are managed via the profile will be described below.

FIG. 3 illustrates an exemplary embodiment of a profile configuration method.

That is, FIG. 3 illustrates the first scheme, which is an exemplary embodiment in which each piece of data is managed in the form of an EF. The attribute data and the policy rule data may be defined in the form of an EF under a master file (MF). In this case, each EF file may have a file ID having the form of '2FXX' according to the ISO7816-4 standard.

When the attribute data and the policy rule data are defined in the form of an EF under an application dedicated file (ADF), each EF file may have a file ID having the form of '6FXX' according to the ISO/IEC 7816-4 standard. An authority to access the EF file may be defined depending on service environment of the eUICC.

An example of a definition of profile type data among the attribute data or policy rule data according to an exemplary embodiment is represented in the form of one byte of coded data as shown in the second table of FIG. 3.

An example of a definition of profile-privilege-associated data among the attribute data or policy rule data of the profile may be represented in the form of coded data as shown in the last table of FIG. 3.

The profile-privilege-associated data may have one or more of the following items.

Automatic selection by a profile (Default selected): a specific profile is automatically selected on a basic logical channel after the eUICC is reset.

Provision of service to another application on eUICC (Global service): as an example of providing global service, for a provisioning profile, there may be service for an operational profile to provide external object access information.

Exemplary embodiments of the profile type and privilege data have been described above. However, attribute data and policy rule data other than the profile type and the privilege data may be defined in the form of an EF similar to those in the tables shown in FIG. 3. That is, the exemplary embodiments do not define all the data, but may include all definitions of the EF forms that may be typically considered.

FIG. 4 illustrates another exemplary embodiment of a profile configuration method.

FIG. 4 illustrates an exemplary embodiment of the second scheme of the profile configuration methods.

As shown in the table of FIG. 4, it can be seen that all the attribute data and policy rule data are defined and managed in the form of one EF.

The attribute data and the policy rule data management file may be defined in the form of an EF under a master file (MF). A corresponding EF file may have a file ID having the form of '2FXX' according to the ISO7816-4 standard.

When the attribute data and the policy rule data are defined in the form of an EF under an application dedicated file (ADF), the corresponding EF file may have a file ID having the form of '6FXX' according to the ISO/IEC 7816-4 standard. An authority to access the EF file may be defined depending on a service environment of the eUICC.

FIG. 5 illustrates still another exemplary embodiment of a profile configuration method.

FIG. 5 illustrates an exemplary embodiment of the third scheme of the profile configuration methods.

FIG. 5 illustrates an object template in the form of a table when the attribute data and policy rule data of a profile are managed in the profile in the form of a data object template. Tag values defined in the table shown in FIG. 5 are arbitrarily defined, and the form in which each piece of the data is defined as a general tag-length-value (TLV) data structure may be considered to follow the structure of the exemplary embodiments of the present disclosure.

Exemplary embodiments of the profile management data among the profile configuration methods according to the exemplary embodiments have been described above with reference to FIGS. 3 to 5, and a profile interoperable interface having the profile management data will be described below.

The interoperable interface with objects inside and outside the eUICC, which is provided by the profile according to an exemplary embodiment includes at least one of the instructions or functions defined below:

Profile selection (SELECT)
Inquire about profile attribute data and policy rule (READ BINARY, READ RECORD, GET DATA)
Add/Modify profile attribute data and policy rule (UPDATE BINARY, UPDATE RECORD, PUT DATA)
Inquire about a profile state (READ BINARY, GET DATA)
Change profile state (UPDATE BINARY, SET STATUS)
Security authentication between profile and external object (or an eUICC-internal module) (INIT UPDATE, EXTERNAL AUTHENTICATE)
Set/Change profile management key (PUT KEY)
Register with eUICC when profile is installed (REGISTER)
Deregister from eUICC when profile is deleted (DEREGISTER).

Several exemplary embodiments of an interoperable interface with the external interoperable device and the eUICC-internal module with respect to the above-described functions will be described below with reference to the drawings.

A profile selection method, which is a first exemplary embodiment of a profile interoperable interface, may be largely classified into two methods. A first method is a method of explicitly selecting a specific profile by transmitting a "selection" instruction using a profile ID of the external interoperable device 400 (or a eUICC-internal module), and a second method is a method of implicitly selecting a specific profile.

Figure 6:
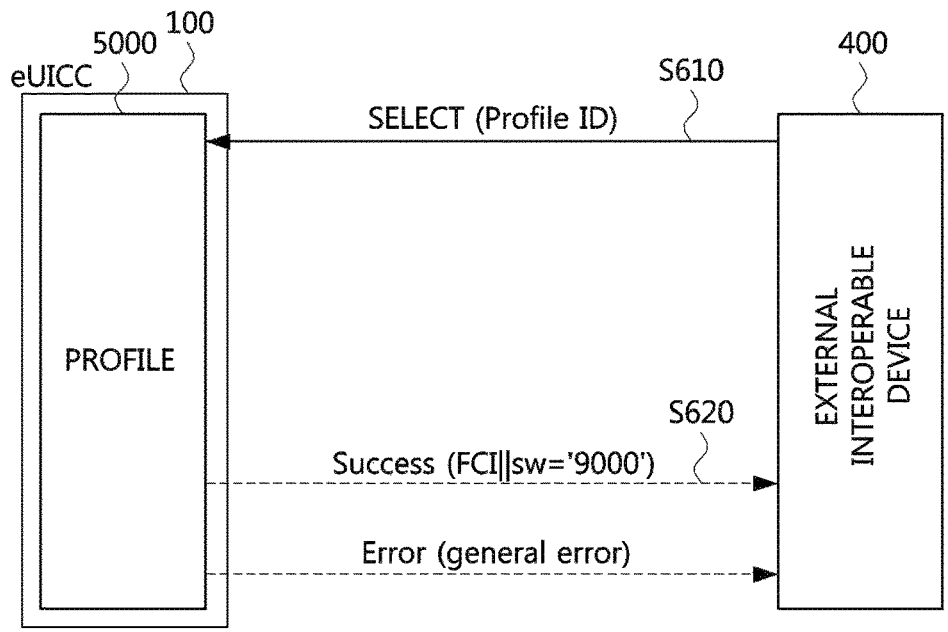
FIG. 6 illustrates an exemplary embodiment of a method of selecting a profile.

FIG. 6 illustrates an exemplary embodiment of a method of selecting a profile.

Specifically, FIG. 6 shows an exemplary embodiment of an interoperable protocol in which the external interoperable device 400 selects a profile when the specific profile is explicitly selected using the profile ID.

The profile 5000 according to an exemplary embodiment may support a SELECT instruction which is a file selection instruction defined as an instruction to select a profile in the ETSI TS 102 221 and a global platform. The external interoperable device 400 may select a specific profile through SELECT instruction provided by the profile 5000 (S610). In this case, the external interoperable device 400 may be a device such as a terminal and an SM. In the exemplary embodiment of FIG. 6, the external interoperable device 400 may be a eUICC-internal module. In this case, the eUICC-internal module may be the profile management unit 130.

As response data in response to the file selection instruction (S610), file control information (FCI) may be returned (S620). The file control information may include a profile ID, profile state information, a profile data size, and the like. The eUICC 100 may check, through the received file control information, whether a corresponding profile is a profile installed on the eUICC and then perform processing such that the corresponding profile is selected.

With respect to a scheme in which a specific profile is implicitly selected, which is a second scheme of the profile (5000) selection methods, when the specific profile has an implicit selection privilege or there is only one profile in an enabled state in the eUICC, the eUICC 100 may implicitly select the corresponding profile. In this case, the external interoperable device 400 may implicitly select a specific profile 5000 using only a task of resetting the eUICC 100, without transmitting an instruction for selecting the profile 5000 to the eUICC 100.

Inquiry about Profile Attribute Data and Policy Rule

A scheme in which the external interoperable device 400 or eUICC-internal module inquires about the above-mentioned profile attribute data and policy rule may be classified into two methods depending on a data management scheme, that is, whether the attribute data and the policy rule data are each an EF file inside the profile or a data object.

According to a first scheme to be described below using FIG. 7, when the attribute data and the policy rule data are managed in the form of an elementary file (EF) inside the profile, the profile may select the EF file and support an instruction to read file data. The external interoperable device 400 (or a eUICC-internal module) may inquire about necessary data through an instruction provided by the profile 5000.

Figure 7:
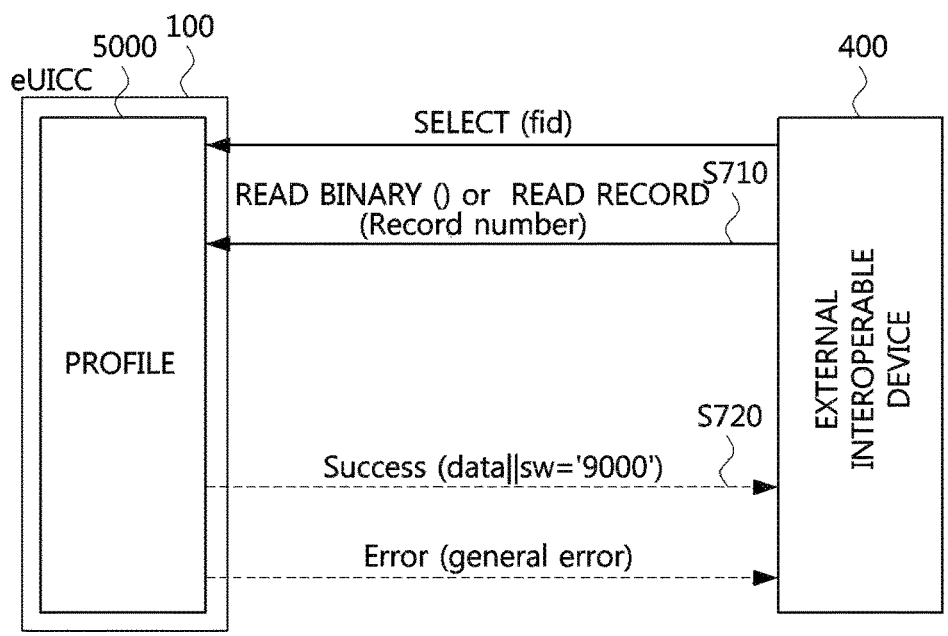
FIG. 7 illustrates an exemplary embodiment of a method of requesting profile attribute data or a policy rule.

FIG. 7 illustrates an exemplary embodiment of a method of inquiring about profile attribute data or a policy rule.

Specifically, FIG. 7 shows an exemplary embodiment of an interoperable protocol in which the external interoperable device 400 inquires about data, when the attribute data and the policy rule are in the form of an EF. The profile 5000 may support READ BINARY or READ RECORD instruction, which is a general file read instruction defined as an instruction to read data in the ISO/IEC 7816-4 and ETSI 102 221, depending on the EF file form.

The external interoperable device 400 may use READ BINARY or READ RECORD instruction (S710) supported by the profile 5000 and inquire about the profile attribute data and policy rule. When a file read instruction is called, the profile 5000 checks a file read approach condition and returns data of a corresponding file only when the condition is satisfied (S720).

A second scheme in which the profile attribute data and policy rule are inquired about according to an exemplary embodiment, is applied when the attribute data and the policy rule are managed in the form of a data object.

Figure 8:
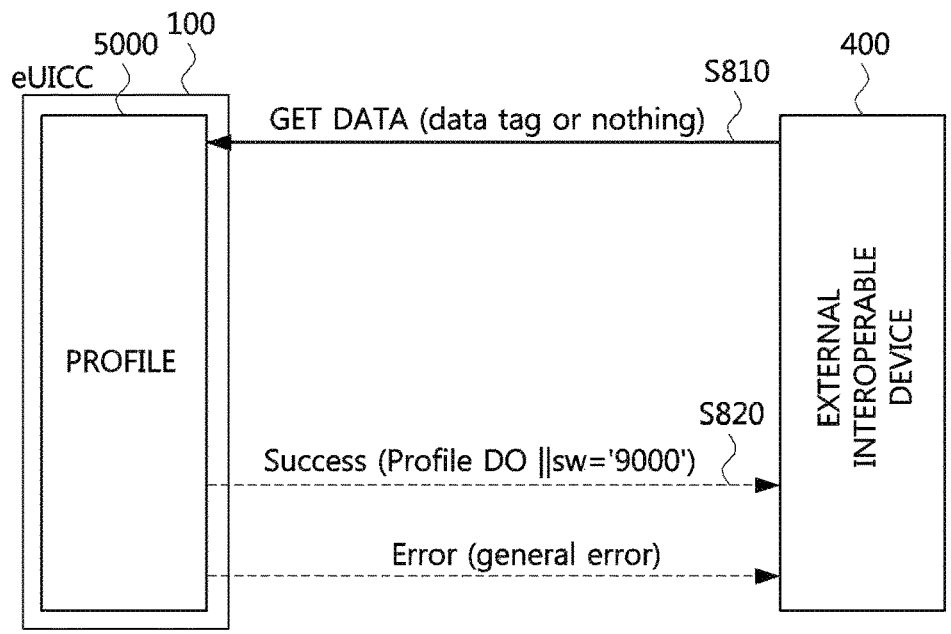
FIG. 8 illustrates another exemplary embodiment of a method of requesting profile attribute data or a policy rule.

FIG. 8 illustrates another exemplary embodiment of a method of inquiring about attribute data or a policy rule according to the present invention.

Specifically, FIG. 8 schematically shows an exemplary embodiment of an interoperable protocol in which the external interoperable device 400 inquires about data, when the attribute data and the policy rule data are in the form of a data object. The profile 5000 supports an instruction to inquire about the data object and provides a function in which the external interoperable device 400 may inquire about the profile attribute data and the policy rule through a corresponding instruction.

The profile 5000 may support GET DATA instruction defined as an instruction to inquire about a data object in the ISO/IEC 7816-4 and a global platform, and the external interoperable device 400 inquires about attribute data using the GET DATA instruction (S810). In this case, the external interoperable device 400 may call the GET DATA instruction without a parameter in order to inquire about all profile management data. The profile 5000 checks effectiveness of the parameter and returns a corresponding data object or all data objects (S820).

As in other exemplary embodiments, the external interoperable device 400 may be a device such as a terminal and an SM. Additionally, the external interoperable device 400 may be replaced with the eUICC-internal module. In this case, the eUICC-internal module may be the profile management unit 130.

Addition/Modification of Profile Attribute Data and Policy Rule

A scheme will be described in which the external interoperable device 400 or the eUICC-internal module adds or modifies the above-described profile attribute data and policy rule. The scheme of adding or modifying the profile attribute data and policy rule may also be divided into two methods according to a data management scheme.

In a first scheme, when the attribute data and the policy rule data are managed in the form of an elementary file (EF) inside the profile, the profile 5000 may support selection of the EF file and instruction of a file update.

Figure 9:
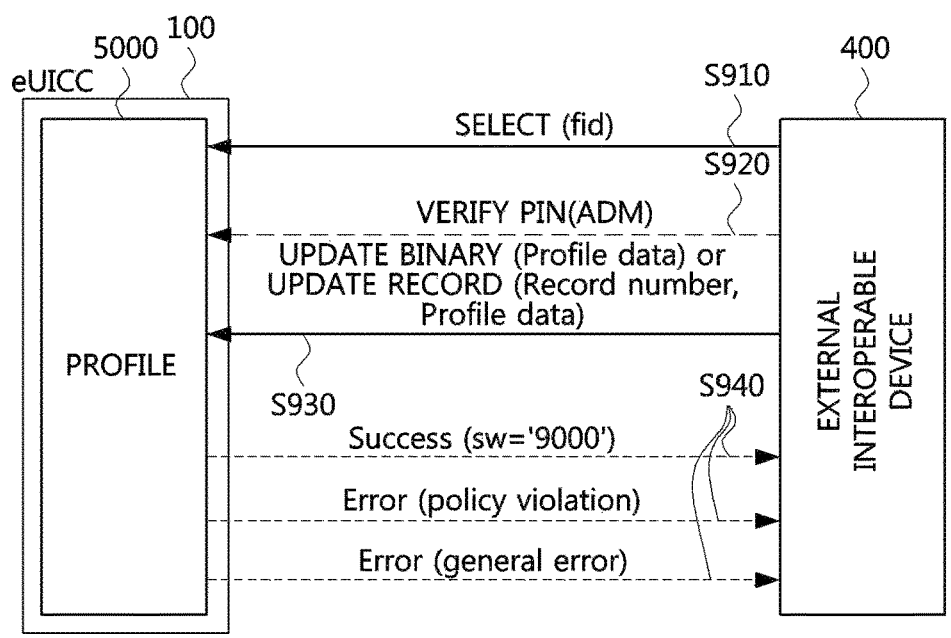
FIG. 9 illustrates an exemplary embodiment of an interoperable interface when profile attribute data and a policy rule are added or modified.

FIG. 9 illustrates an exemplary embodiment of an interoperable interface when profile attribute data and a policy rule are added or modified.

Specifically, FIG. 9 schematically shows an exemplary embodiment of an interoperable protocol in which the external interoperable device 400 adds/modifies data, when the attribute data and the policy rule are in the form of an EF.

The external interoperable device 400 (or the eUICC-internal module) may select an EF file (S910) and may add or modify necessary data through an instruction to update file data (S930).

The profile 5000 may support the UPDATE BINARY or UPDATE RECORD instruction, which is a general file update instruction defined in the ISO/IEC 7816-4 and ETSI 102 221 as an instruction to update data, depending on the EF file form.

The external interoperable device 400 may modify data of the EF file using the UPDATE BINARY or UPDATE RECORD instruction provided by the profile 5000 (S930). Profile data intended to be modified may be set in a data field of the UPDATE BINARY instruction. A record number and data to be modified may be set in a data filed of the UPDATE RECORD instruction.

When a file update instruction is called, the profile checks a file update approach condition and checks whether the approach condition is satisfied. In addition, the profile checks whether or not a specific policy rule is violated (for example, whether to allow the type change and whether to allow the state change) and then returns a policy violation error when the specific policy rule is violated (S940). When the specific policy rule is not violated, the profile updates data of the corresponding file.

In FIG. 9, when the file update approach condition is an administrator authority, a procedure (S920) of inputting VERIFY PIN, which is an authentication instruction of an administrator authentication value (ADM), is performed. An exemplary embodiment enables file update only when the administrator authentication value is normally authenticated.

Figure 10:
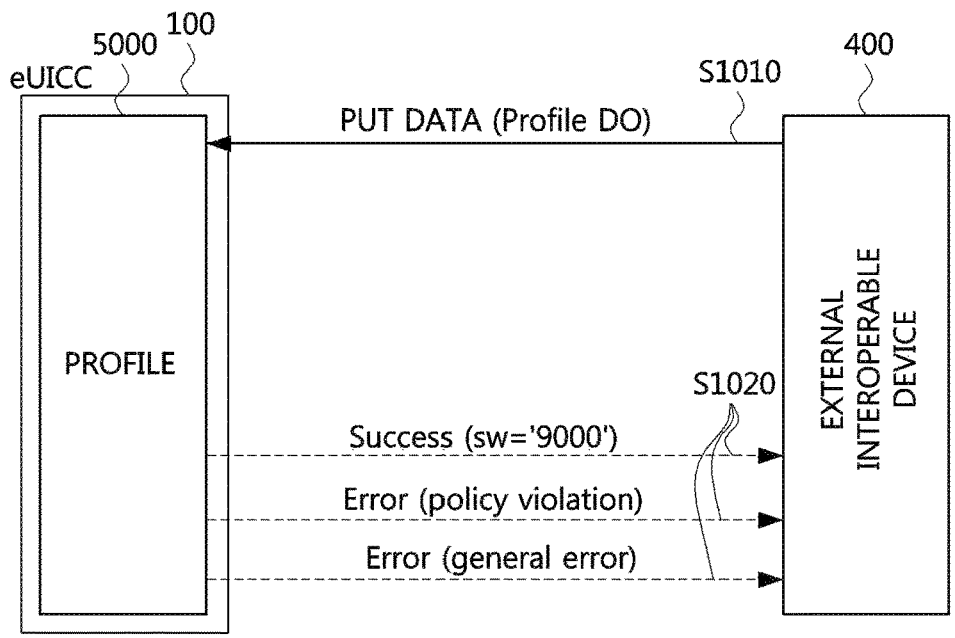
FIG. 10 illustrates another exemplary embodiment of an interoperable interface when profile attribute data and a policy rule are added or modified.

FIG. 10 illustrates another exemplary embodiment of an interoperable interface when profile attribute data and a policy rule are added or modified according to the exemplary embodiment.

Specifically, FIG. 10 schematically shows an embodiment of an interoperable protocol in which the external interoperable device 400 adds/modifies data, when the attribute data and the policy rule are in the form of a data object.

The external interoperable device 400 of the exemplary embodiment may add/modify the attribute data and the policy rule data of the profile using an instruction to update the data object.

The profile 5000 may support the PUT DATA instruction defined as an instruction to add/modify the data object in the IS O/IEC 7816-4. The external interoperable device 400 may add/modify the attribute data and the policy rule data of the profile using the PUT DATA instruction provided by the profile 5000. One profile data object or a date object group of an overlapping structure (constructed encoding) may be set in a data field of the PUT DATA instruction to update one or several data objects.

When a data update instruction is called, the profile 5000 checks a data update authority condition (for example, mutual authentication through a key) and checks whether the authority condition is already satisfied. In addition, the profile 5000 checks whether or not a specific policy rule is violated (for example, whether to allow the type change and whether to allow the state change) and then returns a policy violation error when the specific policy rule is violated (S1020). When the specific policy rule is not violated, the profile adds/modifies a corresponding data object value.

Inquiry about Profile State

Similarly to exemplary embodiments shown in FIGS. 7 and 8, a scheme in which the external interoperable device 400 or the eUICC-internal module inquires about a profile state according to an exemplary embodiment, may involve inquiring about a profile state using the same method as a scheme in which the profile attribute data and the policy rule data, which are defined in an item of the profile attribute data and the policy rule inquiry interoperable interface, are inquired about.

Change of Profile State

A scheme in which the external interoperable device 400 or the eUICC-internal module changes a profile state according to an exemplary embodiment may be divided into two schemes.

As described above through the embodiments shown in FIGS. 9 and 10, a first scheme may change a state through a scheme in which a specific file or data object is changed, by using the same scheme as described with respect to the addition and modification of the profile attribute data and policy rule.

A second scheme for changing a profile state according to an exemplary embodiment is a scheme for changing a state through a specific instruction for changing state information in order to separately assign and manage a state information management authority. The profile 5000 may support an instruction to change the profile state. The external interoperable device 400 may change the profile state using a state change instruction provided by the profile.

Figure 11:
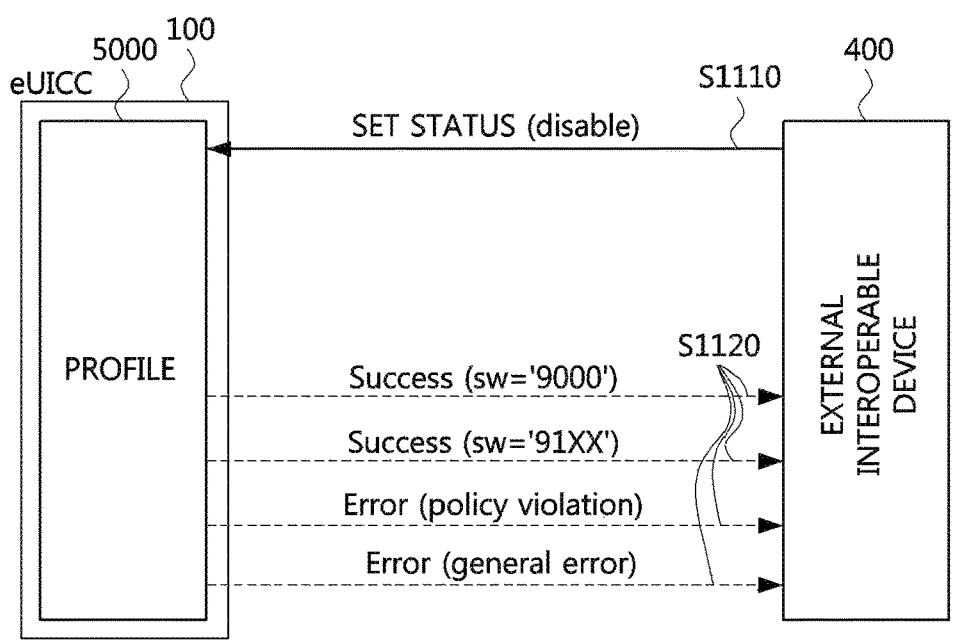
FIG. 11 illustrates an exemplary embodiment of an interoperable interface for changing a profile state.

FIG. 11 illustrates an exemplary embodiment of an interoperable interface for changing a profile state according to an exemplary embodiment.

Specifically, FIG. 11 schematically shows an exemplary embodiment of an interoperable protocol in which the external interoperable device 400 changes the profile state using the state change instruction provided by the profile 5000.

The profile 5000 may support the SET STATUS instruction defined as an instruction to change the state of the profile 5000 in the global platform. The external interoperable device 400 may use the SET STATUS instruction to change the enabled profile to a disabled state or change the disabled profile to an enabled state (S1110). The external interoperable device 400 may call a profile state change instruction after performing mutual authentication with the eUICC according to a security setting of the eUICC in order to change the state of the profile 5000.

When that state change instruction is called and there is a policy rule of whether to allow the profile state change, the profile 5000 checks whether the policy is violated. When the policy is violated, the profile 5000 returns an appropriate error. When the policy is not violated, the profile 5000 changes a state of the profile itself appropriate for a (enabled/disabled) state transmitted as a parameter of the SET STATUS instruction. In this case, when there is a policy rule of whether to notify the state change of the profile, and the value is set, the profile returns a value appropriate for a method of notifying the state change of the profile.

According to an exemplary embodiment, the scheme in which the state change of the profile 5000 is notified may use an over-the-air (OTA) scheme using a short message service (SMS). When the profile 5000 notifies of a state change in the OTA scheme that uses an SMS, the profile 5000 includes and returns a value of '91XX' as a status word in a success message in FIG. 11 (S1120). The terminal or the external interoperable device 400 reads an OTA message from the eUICC 100 and transmits the OTA message to an OTA system of a mobile network operator (MNO) of the profile 5000. Upon receiving the OTA, the mobile network operator may check that the state of the profile 5000 of the eUICC 100 has been changed.

Security Authentication Between Profile and External Interoperable Device

A security authentication scheme between the profile and the external interoperable device (or the eUICC-internal module) includes several schemes according to the key data and authentication scheme. As two representative exemplary embodiments, there are a mutual authentication scheme using a public key and a mutual authentication scheme through a certificate.

A first method, that is, the mutual authentication scheme using the public key, may use a security channel protocol '02' using the pubic key that is defined in the global platform. The profile may support an instruction for supporting security authentication.

Figure 12:
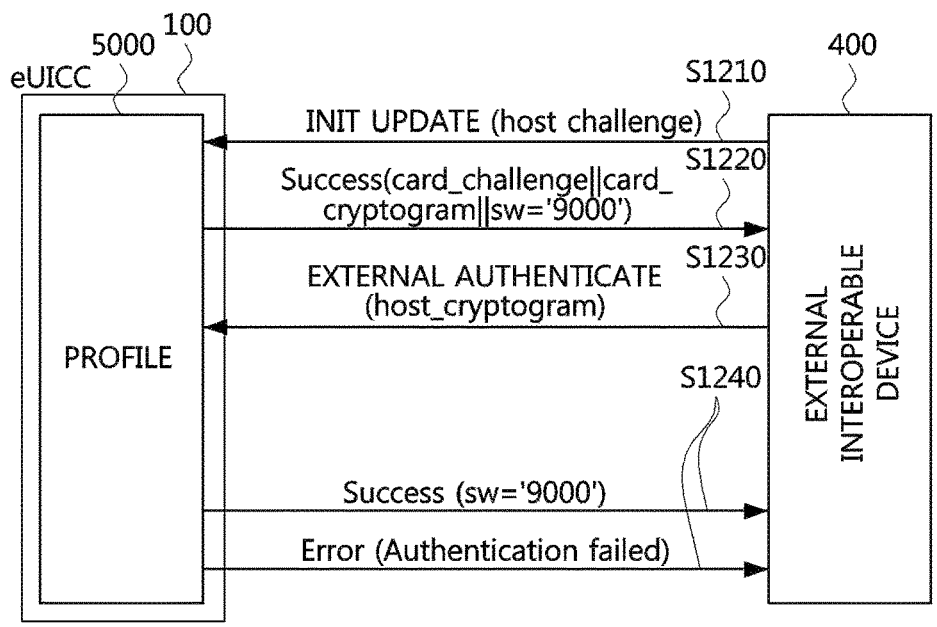
FIG. 12 illustrates an exemplary embodiment of a method of performing security authentication between an external interoperable device and a profile.

FIG. 12 illustrates an exemplary embodiment of a method of performing security authentication between an external interoperable device and a profile according to an exemplary embodiment.

Specifically, FIG. 12 schematically shows an exemplary embodiment of a method of performing mutual security authentication between the profile and the external interoperable device using a public key.

Referring to FIG. 12, the profile 5000 may support the INIT UPDATE instruction and the EXTERNAL AUTHENTICATE instruction provided by the global platform in order to support mutual security authentication using a public key. The external interoperable device 400 performs a procedure of verifying whether the profile 5000 and the external interoperable device 400 have correct keys using an existing shared key, utilizing the INIT UPDATE instruction (S1210) and the EXTERNAL AUTHENTICATE instruction (S1230).

The external interoperable device 400 generates a random value to set the generated random value as data of the INIT UPDATE instruction and transmits the data to the profile (S1210). The profile 5000 uses the pubic key to generate a session key and returns a random value of a card and a value obtained by encrypting the random value to the external-interoperable device 400 (S1220). The external interoperable device 400 also uses the public key to generate the session key and verifies whether the encrypted data received from the profile is correct.

When the encrypted data is correct, the external-interoperable device 400 encrypts a random value generated by the external-interoperable device 400 and transmits the encrypted random value to the profile 5000 (S1230). The profile 5000 checks whether the encrypted value transmitted by the external interoperable device 400 is correct and then returns a success/failure result (S1240).

According to a second scheme, that is, an exemplary embodiment of a method of performing security authentication between the profile and the external interoperable device using the certificate, a certificate-based security channel protocol (secure channel protocol '10') provided by the global platform may be used. A procedure and instructions of the security authentication scheme may conform to a scheme defined in the global platform.

Setting/Changing of Profile Management Key

A scheme in which the change is performed using a separate key management instruction may be used as a method of the external interoperable device changing a management key of the profile. Since a management key is allowed only to a module having a specific authority, authority check is performed through the security authentication scheme that has been described with respect to security authentication between the profile and the interoperable device, and then instructions can be performed.

Figure 13:
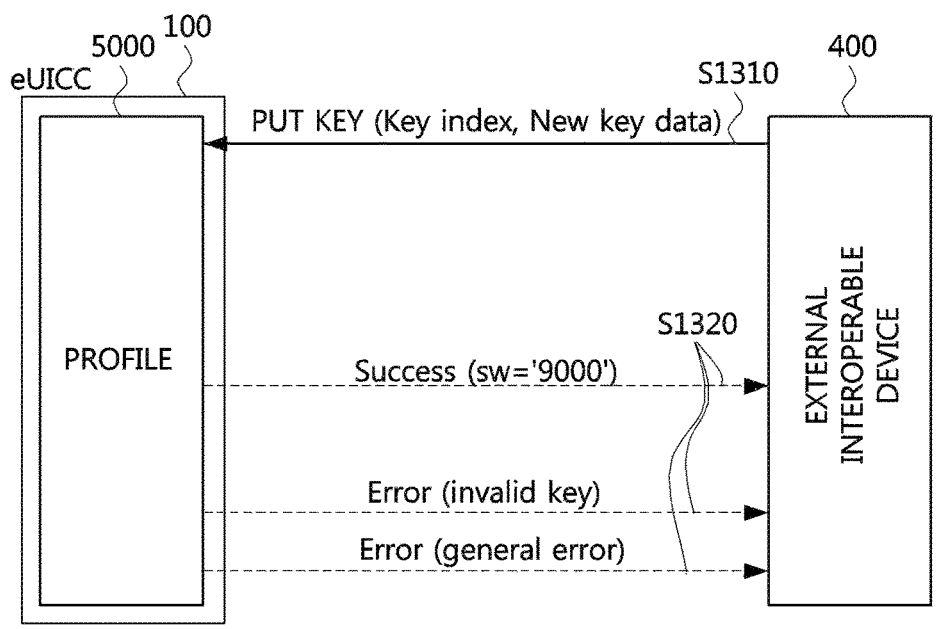
FIG. 13 illustrates an exemplary embodiment of an interoperable protocol when an external interoperable device sets or changes a profile management key.

FIG. 13 illustrates an exemplary embodiment of an interoperable protocol when an external interoperable device sets or changes a profile management key according to the exemplary embodiment.

The profile 5000 according to an exemplary embodiment provides an instruction to change the management key, and the instruction may be the PUT KEY instruction defined in the global platform to set/change keys.

The external interoperable device 400 may set/change a profile management key using the PUT KEY instruction provided by the profile 5000. When the profile 5000 has a security authentication scheme policy to acquire an authority to set/change a management key, the external interoperable device 400, as described above through the exemplary embodiment of FIG. 12, may previously perform an authentication procedure described in a section associated with security authentication between the profile 5000 and the external interoperable device 400 (or the eUICC-internal module).

The external interoperable device 400 may use a data field having a PUT KEY instruction to set a key index to be set or changed and new key data (S1310). The profile 5000 normally performs security authentication or the like before calling an instruction and checks whether a security policy is violated. The profile 5000 sets or changes the new key data when the security policy is not violated, and delivers the result value to the external interoperable device 400.

Register with eUICC when Profile is Installed

A scheme of registering the profile 5000 with the eUICC-internal module 150 when the profile 5000 is installed according to an exemplary embodiment includes a scheme in which the profile uses a profile registration interface provided by the eUICC-internal module 150.

The eUICC-internal module 150 may integrally manage profile attribute information such as a list of profiles installed on the eUICC and a type/state/NAA list of each profile. The eUICC-internal management module 150 according to an exemplary embodiment may be, for example, the profile management unit 130 or the eUICC platform 120, which has been described through FIG. 2.

The eUICC-internal module 150 may provide a profile registration interface to acquire profile information. The profile 5000 may use the profile registration interface to register information such as a profile identifier, a profile type, a state, and an NAA list with the eUICC-internal module 150 when installed on the eUICC.

Figure 14:
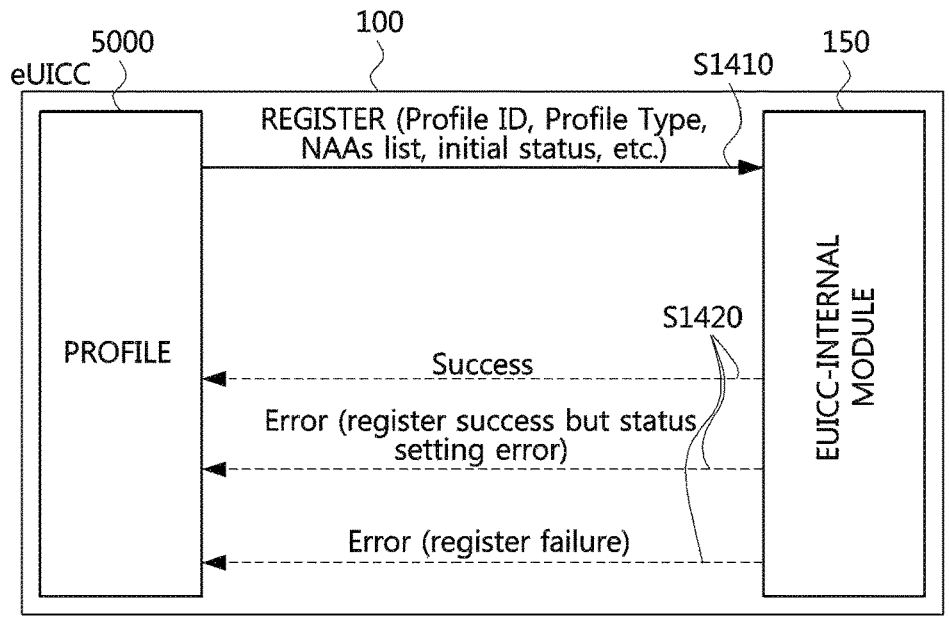
FIG. 14 illustrates an exemplary embodiment of an interoperable protocol for registering profile information.

FIG. 14 illustrates an exemplary embodiment of an interoperable protocol for registering profile information.

Specifically, FIG. 14 shows an exemplary embodiment of the interoperable protocol used for the profile to register profile information with the eUICC-internal module.

The eUICC-internal management module 150 may provide the REGISTER instruction to an internal interface (e.g., application programming interface (API)) for registering the profile 5000.

The profile 5000 may call the REGISTER instruction provided by the eUICC-internal management module 150 when the profile installation is completed and register the profile information (for example, a profile identifier, a type, a state, and an NAA list) with the eUICC-internal management module 150 (S1410). When the REGISTER instruction is called, the eUICC-internal management module 150 checks legitimacy of the profile information and then stores and manages the profile information in a memory such as a data storage. Subsequently, the eUICC-internal management module 150 returns a result value associated with the profile registration to the profile 5000 (S1420).

Examples of an API for registering the profile information used in an exemplary embodiment of FIG. 14 with the eUICC-internal management module 150 may include REGISTER (Profile ID, Profile Type, NAAs list, initial status). The REGISTER instruction is used to register the profile information with the eUICC-internal management module, and a parameter of the REGISTER instruction may include a profile identifier, a profile type, a list of NAAs belonging to the profile, an initial profile state (enabled/disabled) of the installation.

Deregister from eUICC when Profile is Deleted (eUICC-Internal Interface)

A scheme of deregistering the profile from the eUICC-internal module when the profile is deleted according to an exemplary embodiment includes a scheme in which the profile uses a profile deregistration interface provided by the eUICC-internal module.

The eUICC-internal management module 150 may integrally manage the profile information installed on the eUICC. The eUICC-internal management module 150 may provide a profile deregistration interface to delete registered profile information.

Figure 15:
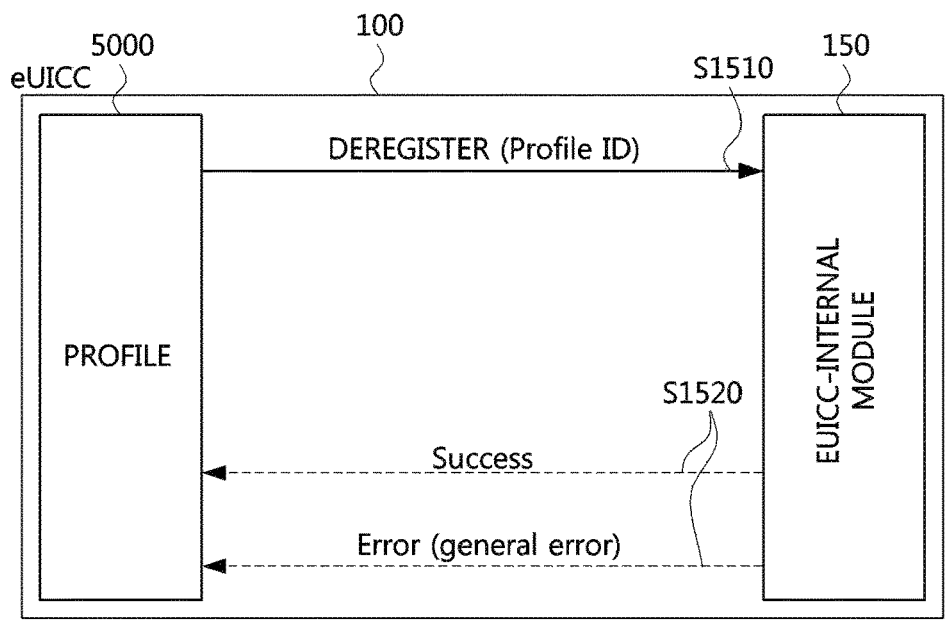
FIG. 15 illustrates an exemplary embodiment of an interoperable protocol for deregistering a profile.

FIG. 15 illustrates an exemplary embodiment of an interoperable protocol for deregistering a profile according to an exemplary embodiment.

Specifically, FIG. 15 shows an exemplary embodiment of the interoperable protocol used for the profile to request profile deregistration from the eUICC-internal management module.

The eUICC-internal management module 150 may provide the DEREGISTER instruction to an internal interface for profile deregistration.

When a profile deletion procedure starts, the profile 5000 may call the DEREGISTER instruction provided by the eUICC-internal management module 150 and request the profile deregistration (S1510). When the DEREGISTER instruction is called, the eUICC-internal management module 150 checks whether the profile of which deregistration has been requested is a registered profile identifier and then deletes profile management information. Subsequently, the eUICC-internal management module 150 returns a result value associated with the profile deregistration to the profile 5000 (S1520).

An example of the API for deregistering the profiled used in the exemplary embodiment of FIG. 15 from the eUICC-internal management module 150 may include DEREGISTER (Profile ID), which may be used to deregister the profile from the eUICC-internal management module. A parameter of the DEREGISTER instruction may include a profile ID.

Profile Security Characteristics

The profile according to an exemplary embodiment secures confidentiality and integrity of an instruction application protocol data unit (APDU) communicated with the external interoperable device and the eUICC-internal management module.

An example of a scheme in which the profile according to an exemplary embodiment secures confidentiality and integrity of the instruction APDU includes a scheme using a security channel. In a security channel creation scheme, the security authentication as defined in a section associated with security authentication between the profile and the external interoperable device (or the eUICC-internal module) as described through the exemplary embodiment of FIG. 12 is performed, and when the security authentication is successfully performed, the security level setting and the session key creation are completed.

The profile and the external interoperable device may secure confidentiality and integrity of the instruction APDU by performing data encryption thereon, and creating a data authentication code (message authentication code (MAC)) of an instruction through the created session key and then adding the instruction to the APDU to perform transmission.

An instruction security message scheme through a security channel may be applied only to a case in which an external-interoperable device (or an eUICC-internal management module) having a specific authority on the eUICC management policy such as change of a profile state, addition/modification of profile attribute data and a policy rule, and setting/change of a profile management key, performs an applicable interface.

The profile according to the present invention also supports remote management such as change of the profile attribute data and policy rule and change of the profile state through over-the-air (OTA).

Keys for a security channel and an OTA management function of the profile according to an exemplary embodiment may be managed securely and separately. In addition, a profile owner may change each key to a new key according to a profile management key setting/changing scheme as described through the exemplary embodiment of FIG. 13.

In this case, the profile owner may be, for example, a network service operator (MNO) or subscriber management module (subscriber manager).

Figure 16:
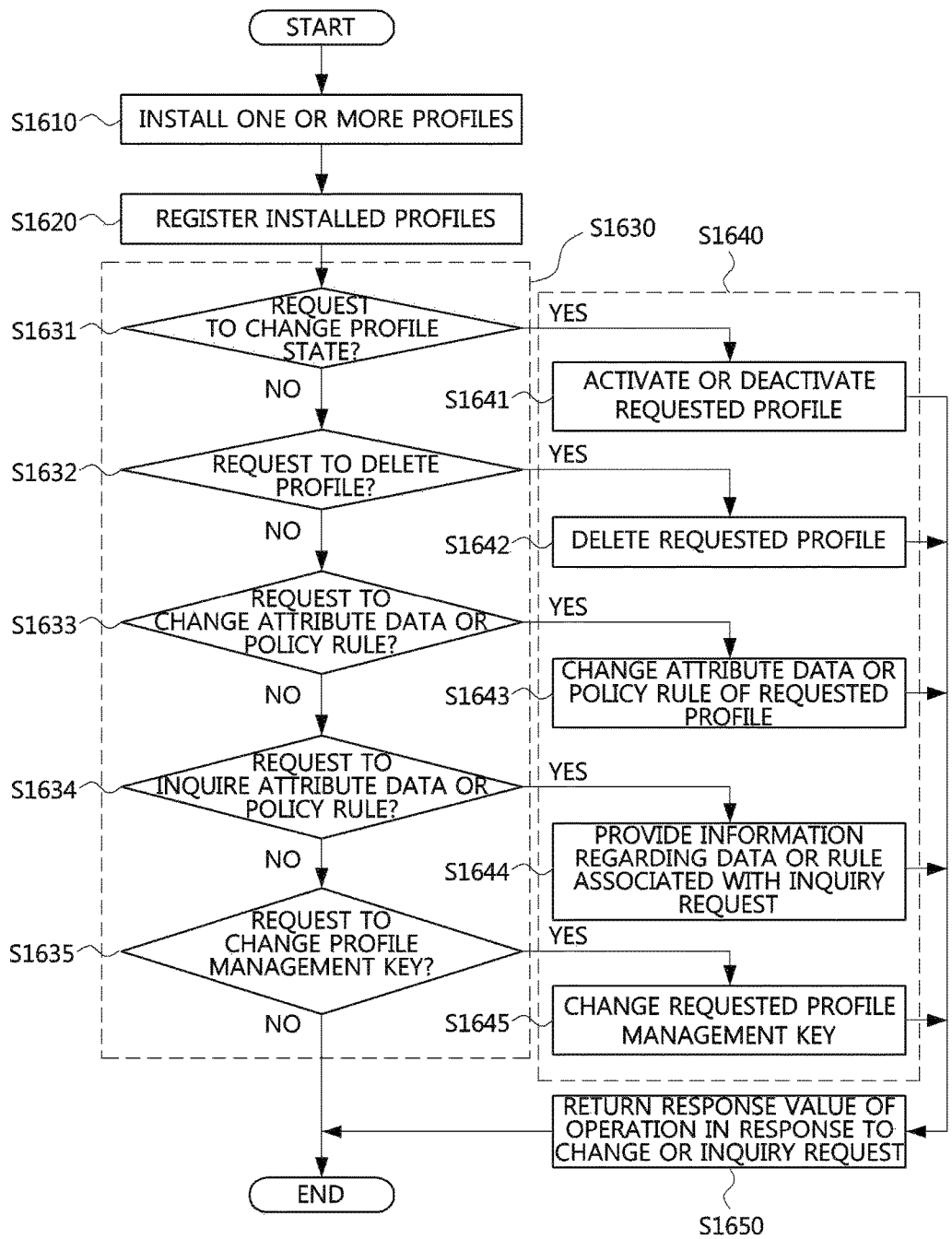
FIG. 16 is an operational flowchart of a profile configuration method according to an exemplary embodiment.

FIG. 16 is an operational flowchart of a profile configuration method according to an exemplary embodiment.

The profile configuration method according to the exemplary embodiment, which is shown in FIG. 16, may be mainly performed by a subscriber authenticating module embedded and installed in the terminal device, for example, an eUICC.

The profile configuration method according to an exemplary embodiment may largely include operations of: installing one or more profiles (S1610), registering the installed profiles (S1620), receiving a request to change or inquire about the installed one or more profiles (S1630), performing an operation according to the change or inquiry request (S1640), and returning a response value of the operation in response to the change or inquiry request (S1650). Here, the one or more profiles may be identified with unique identifiers.

As a detailed example, the operation of receiving a request to change or inquire about the installed one or more profiles (S1630) may include operations of receiving a request to change a state of the profile (S1631), receiving a request to delete the profile (S1632), receiving a request to change attribute data or a policy rule (S1633), receiving a request to inquire about the attribute data or policy rule (S1634), and receiving a request to change a profile management key (S1635).

Here, it should be understood that the request to change or inquire about the profiles illustrates some of various exemplary embodiments that may be considered according to a profile interoperable interface according to an exemplary embodiment, and there may be various change or inquiry requests associated with the profile attribute data or policy rule.

In addition, the operation of performing an operation according to the change or inquiry request (S1640) may include operations of: changing the requested profile to an enabled state or disabled state (S1641), deleting the requested profile (S1642), changing the attribute data or policy of the requested profile (S1643), providing information regarding the data inquired about (S1644), and changing a management key of the requested profile (S1645).

The above-listed detailed operations are sequentially shown, as an example, only for convenience. Accordingly, the order may be changed, and the operations S1631, S1632, S1633, S1634, and S1635 for receiving the request may be configured to be integrated into one operation.

The profile configuration method including the steps, operations, and instructions described above through the exemplary embodiments can be implemented with program codes executable by a computer in a computer-readable recording medium.

The computer-readable recording medium is any kind of recording medium for storing data that may be read by a computer system. Examples of the computer-readable recording medium include a read-only memory (ROM), a random access memory (RAM), a compact disk (CD)-ROM, a digital versatile disk (DVD)-ROM, a Blu-ray, a magnetic tape, a floppy disk, and an optical data storage device. Further, the recording medium may be implemented in the form of a carrier wave such as Internet transmission.

Also, the computer-readable recording medium can also be distributed throughout a computer system connected over a computer communication network so that the computer-readable codes may be stored and executed in a distributed fashion. Also, functional program codes for accomplishing the technical spirit of the present invention may be easily construed by programmers skilled in the art to which the present invention pertains.

As described above, the exemplary embodiments relate to a function that should be basically provided by the profile in order for the eUICC-internal management module or the external interoperable device to manage profiles installed on the eUICC, and includes contents regarding the profile management data, the external-interoperable interface, and security characteristics.

By defining the attribute data and policy rule that are basically managed by the profile, the external interoperable device and the eUICC-internal management module can inquire about basic information of the profile, modify necessary information and synchronize data between the eUICC-internal module and the external management system. Further, an exemplary embodiment proposes a method in which a profile owner (for example, a network server operator) assigns a policy rule needed for profile management and the profile itself may perform the policy, by defining the profile policy rule and the scheme for performing the profile rule.

In addition, exemplary embodiments also propose a method of standardizing a minimum interface needed to manage the profile to allow the external interoperable system or eUICC-internal interoperable device that manages the profile to acquire the profile information and modify information, a state, or the like, by defining an interoperable interface that may be provided by the profile.

Lastly, an exemplary embodiment also proposes a method in which the proposed management functions may be performed in a securely safe environment by defining security characteristics of the profile.

As described above, it is possible to allow an eco-system operator such as a network service operator, a eUICC manufacturer, and a terminal manufacturer to develop a eUICC and provide a eUICC service efficiently and rapidly by standardizing the profile data and interface, and security characteristics.

While the example embodiments and their advantages have been described in detail, it should be understood that various changes, substitutions and alterations may be made herein without departing from the scope of the invention.

The invention claimed is:

1. An embedded universal integrated circuit card (eUICC) embedded and installed in a mobile terminal, the eUICC comprising:
    at least one processor managing one or more profiles including one or more sets of data associated with a network access application, the one or more profiles having unique identifiers; and
    a profile installer which manages and installs the one or more profiles,
    wherein the eUICC interoperates with a subscription manager,
    wherein the profile comprises a profile storage that manages profile attribute data,
    wherein the profile attribute data comprises at least one of a profile identifier, a profile type, and mobile network operator information, and
    wherein the profile includes a profile-associated policy rule comprising at least one piece of data regarding one or more from among whether to allow profile deletion, whether to notify profile state change, whether to allow a profile state change, whether to allow a profile type change, and whether to allow profile initialization.

2. The eUICC of claim 1, wherein the profile further includes one or more network access applications.

3. The eUICC of claim 1, wherein the profile attribute data further comprises one or more of profile state information, a list of network access applications belonging to the profile, a privilege, a profile data size, a profile version, and a terminal type supported by the profile.

4. The eUICC of claim 1, wherein the profile further includes a provisioning profile containing one or more network access applications and associated network access credentials which, when installed on the eUICC, enables access to a communication network and an operational profile containing one or more network access applications and associated network access credentials.

5. The eUICC of claim 1, wherein the profile further comprises a policy performing unit that performs a profile-associated policy rule.

6. The eUICC of claim 1, wherein the profile further includes an interface for interfacing with an object inside or outside the eUICC.

7. The eUICC of claim 6, wherein the interface receives a request for one or more from among a profile selection, profile associated information management, security authentication, profile management key management, and profile-registration-associated management, and returns a value corresponding to a processing result for the request.

8. The eUICC of claim 1, wherein the profile provides secure messaging to communicate with an object provided inside or outside the eUICC.

9. A mobile terminal comprising:
an embedded universal integrated circuit card (eUICC) which is embedded and installed in the mobile terminal, the eUICC comprising at least one processor which manages one or more profiles which include one or more sets of data associated with a network access application, the one or more profiles having unique identifiers; and a profile installer which manages and installs the one or more profiles; and
wherein the eUICC interoperates with a subscription manager,
wherein the profile comprises a profile storage that manages profile attribute data,
wherein the profile attribute data comprises at least one of a profile identifier, a profile type, and mobile network operator information, and
wherein the profile includes a profile-associated policy rule comprising at least one piece of data regarding one or more from among whether to allow profile deletion, whether to notify profile state change, whether to allow a profile state change, whether to allow a profile type change, and whether to allow profile initialization.

10. The mobile terminal of claim 9, wherein the profile further includes one or more network access applications.

11. The mobile terminal of claim 9, wherein the profile attribute data further comprises one or more of a profile state information, a list of network access applications belonging to the profile, a privilege, a profile data size, a profile version, and a terminal type supported by the profile.

12. The mobile terminal of claim 9, wherein the profile further includes a provisioning profile containing one or more network access applications and associated network access credentials which, when installed on the eUICC, enables access to a communication network and an operational profile containing one or more network access applications and associated network access credentials.

13. The mobile terminal of claim 9, wherein the eUICC returns a response value to the subscription manager in response to one from among a request to change and an inquiry.

14. A profile configuration method performed by an embedded universal integrated circuit card (eUICC) embedded and installed in a mobile terminal, the profile configuration method comprising:
configuring one or more profiles including one or more sets of data associated with a network access application, the one or more profiles having unique identifiers and being included in the eUICC embedded and installed in the mobile terminal, the eUICC comprising a profile installer which manages and installs the one or more profiles,
wherein the eUICC interoperates with a subscription manager,
wherein the profile comprises a profile storage that manages profile attribute data,
wherein the profile attribute data comprises at least one of a profile identifier, a profile type, and mobile network operator information, and
wherein the profile includes a profile-associated policy rule comprising at least one piece of data regarding one or more from among whether to allow profile deletion, whether to notify profile state change, whether to allow a profile state change, whether to allow a profile type change, and whether to allow profile initialization.

15. The method of claim 14, wherein the profile further includes a provisioning profile containing one or more network access applications and associated network access credentials which, when installed on the eUICC, enables access to a communication network and an operational profile containing one or more network access applications and associated network access credentials.

16. The method of claim 14, wherein the profile further includes one or more network access applications.

17. The method of claim 14, wherein the profile attribute data further comprises one or more of profile state information, mobile network operator information, a list of network access applications belonging to the profile, a privilege, a profile data size, a profile version, and a terminal type supported by the profile.

18. The method of claim 14, further comprising receiving a request to change or an inquiry about profile-associated information from an object positioned inside or outside the eUICC.

19. The method of claim 18, further comprising returning a response value to the object positioned inside or outside the eUICC in response to the change or inquiry.

* * * * *